United States Patent

[11] 3,545,483

| [72] | Inventor | Luigi Giovanni Valdenazzi |
| | | Via Antonini, 2, Genova, Italy |
| [21] | Appl. No. | 811,279 |
| [22] | Filed | March 24, 1969 |
| [45] | Patented | Dec. 8, 1970 |
| [32] | Priority | March 23, 1968 |
| [33] | | Italy |
| [31] | | No. 6,906-A/68 |

[54] SELF-ACTING, TELECONTROLLED ANTIEXPLOSION VALVE
13 Claims, 1 Drawing Fig.

[52] U.S. Cl. ............... 137/487.5, 137/495, 137/498, 251/26
[51] Int. Cl. .................. F16k 17/32
[50] Field of Search ..................... 251/26; 137/495, 498, 487.5, 219, 220

[56] References Cited
UNITED STATES PATENTS

| 3,160,168 | 12/1964 | Kowalsi et al. | 251/26X |
| 3,192,940 | 7/1965 | Wiersholm | 251/26X |
| 3,252,477 | 5/1966 | Chard | 137/486 |
| 3,439,706 | 4/1969 | Barrett | 251/26X |

*Primary Examiner*—M. Cary Nelson
*Assistant Examiner*—Michael O. Sturm
*Attorney*—Diller, Brown, Ramik & Holt

ABSTRACT: An antiblast valve for pipelines is disclosed, having a plunger which is kept open by the pressure obtaining in said pipeline, movable pressure responsive members being provided internally of the valve body for causing a quick closure of the valve by a plug whose closing movement is properly braked.

PATENTED DEC 8 1970
3,545,483
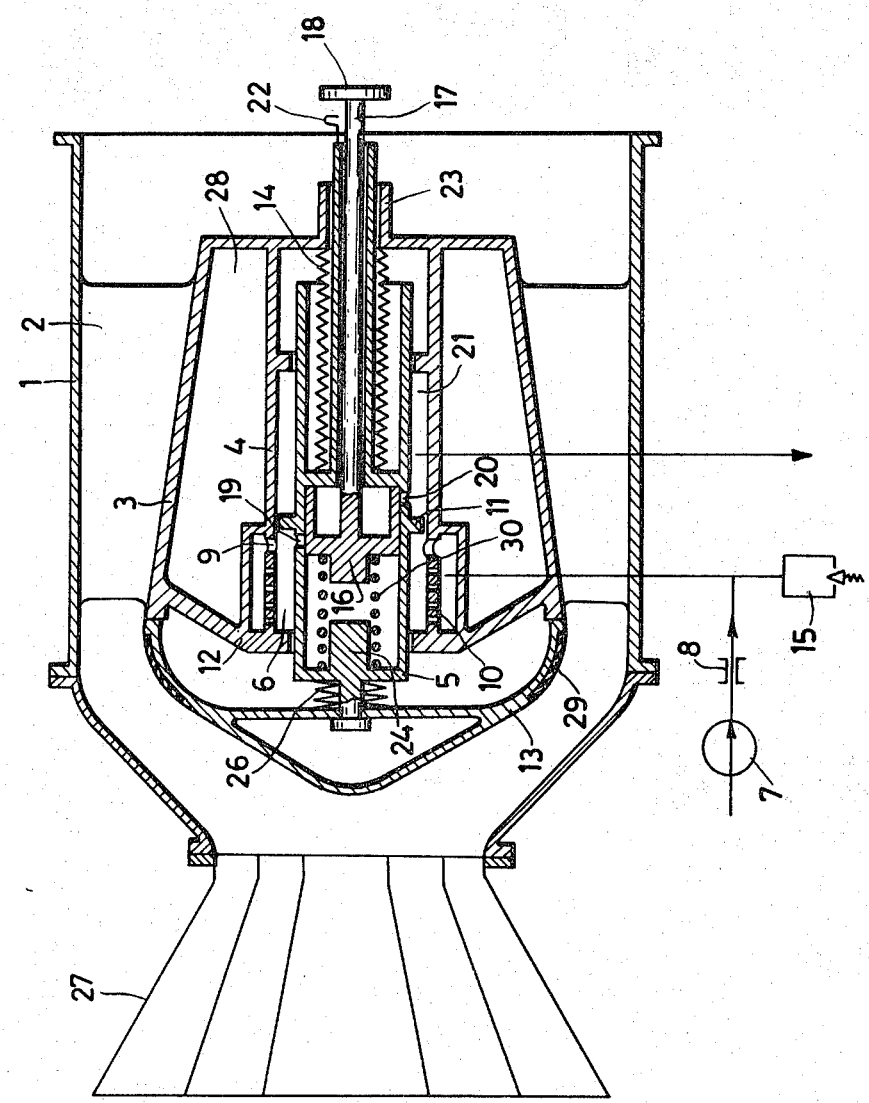
INVENTOR
LUIGI GIOVANNI VALDENAZZI
BY
Diller Brown Ramick Holt
ATTORNEYS

SELF-ACTING, TELECONTROLLED ANTIEXPLOSION VALVE

It is known that technical applications exists, in which, due to a fortuituous circumstance, such as an explosion, an overpressure wave can be propagated along a pipeline, said wave being susceptible of causing damages to objects and humans as it reaches the premises or the devices connected with the pipeline.

It is also known, that, in similar cases, it is usual to equip the duct with specially provided valves, commonly called antiexplosion or antiblast valves, adapted to become closed both under the action of a telecontrol prior to the arrival of the shock front, or under the direct action thereof.

This invention relates to a particular valve of the kind referred to above, which is adapted to combine in itself the two distinct operation modes, that is, the closure by telecontrol (for example on the basis of a danger signal as detected by an appropriate detector) or by the direct impact of the shock front on the valve. As compared with the existing versions of such devices, the inventive valve exhibits a few particular features which enable it to attain closure speeds which are by far higher than those of the conventional valves, without any detrimental effect on the movable parts but, conversely, with an improved tightness when the valve is closed and a reduced pressure drop. In addition, in its embodiments having a larger size, the valve is adapted to self-contain all the electronic, electric and hydraulic implementation which is necessary for its operability, so that the valve is protected both against the detrimental effects of possible electromagnetic troubles tending to interfere with the correct operation of the electric and electronic components.

On the other hand, the valve is also protected against the effect of shocks, such as those caused by the explosion on the structure to which the duct (wherein the valve is mounted) is affixed, when the duct, of course, is resiliently suspended with respect to said fixtures.

Having now reference to the single FIG. of the accompanying sheet of drawings, which shows a possible constructive reduction to practice of the valve, without any implied limitation to the scope of this invention, it can be noticed that the valve is of a quite particular streamlined design. Its outer casing, 1, which can well be the extension of the duct to which the valve is connected, and has the same diameter as the duct, is appropriately tapered until exhibiting a throttled section, whereupon the cross-sectional area becomes gradually widened by the agency of a choke 2, to reach the fluid flow initial cross-sectional area again. In the interior of the valve, by the agency of streamlined radial gills intended to offer a minimized resistance to motion, the hub 3 is coaxially suspended. In its interior, said hub has a cylindrical portion 4, which, together with the movable plunger 5 and the appropriate sealing members which can be seen on the drawing, makes up an annular oleodynamic cylinder 6, to which pressurized oil can be fed, as coming from the oleodynamic pump 7 via the throttled section 8, through a set of ports formed along the peripheral surface of the cyclinder 4. Said ports have appropriate diameters and are suitably spaced angularly apart from one another as can be seen on the drawing. More accurately, there is a set of ports 9 of large diameter, circumferentially arranged on the cylinder, at the right end thereof as viewed in the drawing, and a set of ports 10, having a lesser diameter, which are evenly spread along the periphery of the cylinder and are spaced apart from one another with a suitable pitch between a row and the next until covering the entire length of the cylinder between the plunger 11 and the tightness lid 12. The cylinder 5 is shown in FIG. 1 in the position in which the valve is open, that is where the plug 13 contacts the hub 3 of the valve. The outlines of the hub 3, of the plug 13, and of the outer casing, as well as of the choke 2, are such as to ensure a gradual acceleration, or deceleration, of the fluid, so as to minimize the pressure drops which are unavoidably induced by the velocity variations of the fluid. The inner barrel 5 is urged in its extreme right position, when the valve is open and the plug 13 contacts the hub 3, by the oil pressure acting in the interior of the annular cylinder 6. Said oil pressure is counteracted by a pack of very powerful cup springs 14, so that, when a sudden pressure drop of the oil in the annular cylinder 6 is caused by an appropriate means, the main plunger, under the bias of the spring pack 14, is shifted towards the closure position until the plug comes to contact the casing 1, the swifter, the greater is the bias of the spring pack 14. A limitation of the shape which can be given to the springs 14 is the one shown by the possibility of damage to the plug due to an impact at too high a speed, but one of the basic principles of this invention is a particular constructional arrangement which just permits the use of powerful springs 14 without causing any of the damages outlined above.

The single FIG. of the accompanying sheet of drawings is illustrative of the principle indicated above. Let it be assumed that, by an appropriate means, such as by suddenly opening a dump valve 15, the pressure within the annular barrel 6 is caused to drop to a small a value. If so, the spring pack 14 is no longer biased by the pressural force of the oil and accelerates the movable portion of the valve towards the closure position. By so doing, the plunger 11 drives the oil which is present in the chamber 6, off through the ports 9 and 10. However, as the edge of the plunger 11 has gone past the set of the circumferential ports 9, which afford a wide outlet area, it can effect dumping only through the set of ports 10: these have, as outlined above, a much lesser size and an axial spacing along the valve, which has been properly proportioned. For this reason, as the plunger 11 is being moved towards the closure position, it sequentially covers the dumping ports 10, so reducing the flow cross section for the oil, the result being, of necessity, a lamenation; this can be adjusted by appropriately selecting the diameter, the number and the spacing of the ports so that the pressure in the annular chamber 6 is caused to rise, according to a preselected law of variation, to such a value as to counteract the accelerating bias of the springs 14 and also the inertia taken by the movable portion of the valve due to its speed, a braking stage being thus obtained which can be adjusted in such a way that the contact of the plug with its seating may occur, rather than at the high speed one would experience if any braking action would be lacking, at a reduced residual speed to be properly selected and, which, at any rate, would be such as to prevent any damage to both the fixed and movable parts coming into mutual contact.

Said law of variation of the braking action which, as has been seen above, can be selected at leisure, could be such not only as to ensure a reduced residual speed at the impact but also such a deceleration law as to minimize the braking stresses to the movable members. In the drawing, the sudden pressure drop in the cylinder 6, which is necessary to start the motion of the movable component parts of the valve, is diagrammatically shown by the effect of the sudden opening of the plug of a valve 15, to be called "quick-opening valve". Irrespective of the method of actuating the quick opening valve, the present invention is based on the property that the circuits which cause said actuation are such that, once the valve has been closed, its recocking, that is the reopening of the antiexplosion valve, should be be necessarily effected manually.

This invention is characterized, moreover, by the possibility of the valve being closed under the direct action of a pressure wave impinging thereon, for example due to misfunction of the circuits leading to the opening of the valve 15. The valve is thus equipped with a plunger 16 held in the interior of the main plunger 5. The plunger 16, under normal operative conditions, is biassed by a spring 30 in its standby position as shown at the right of the drawing. The plunger 16 is connected, through a stem 17, to a dish 18 which juts from the internal body of the valve and which can thus be directly thrust by the shock wave. The plunger 16 controls the outlet ports 19 formed through the plunger 5 and the ports 20 formed through the same plunger in a position which is shifted towards the right. When, due to the effect of a pressure wave upon the dish 18, the plunger 16 is shifted leftwards, it effects a communication between the contents of the annular cylinder 6 and the discharge chamber 21, which communicates with the discharge tank of the oleodynamic circuitry. Said communication takes place through the ports 19 and 20 and, due to the effect of the sudden pressure drop in the chamber 6, the plunger 5 immediately starts its motion towards the closure position. There is, in addition, and end of stroke switch 22 on the valve, said switch being pressed by the dish 18 as soon as the latter has been withdrawn from its standby position, so that the actuation of the valve by the shock wave impinging directly thereover is such as concurrently to actuate also the telecontrol circuit ending at the quick opening valve 15.

The casing 3 is terminated, in its extreme right portion, by an extension 23 on which the end of stroke switch 22 is installed and against which the dish 18 is stopped. Thus the motion of the plunger 16 is discontinued and, while the main plunger 5 and the plug 13 connected therewith go on towards the closure position, the ports 19 and 20 are closed again due to the stoppage of the plunger 16. The motion of the plug is unhindered thereby, inasmuch, as outlined above, as the actuation of the end of stroke switch causes the completion of the electric-hydraulic circuit for closing the valve. The closure will thus be effected in the same operative mode as described above, that is, with the braking action due to the gradual throttling of the flow cross section as represented by the set of ports 10. The plunger 16, under these conditions, has but the task of starting motion, causing the same to be proceeded with and to take place in the manner described for closing the valve by the effect of opening the quick-dumping valve 15. However, in the stage at which the dish 18 is thrust by the shock wave and is shifted towards the left until abutting the abutment 24 integral with the plunger 5, the latter is urged not only by the bias of the spring pack, but also by the force exerted by the overpressure on the dish 18, so that the acceleration stage of the movable parts will be enhanced by this secondary effect, and said increase of the initial acceleration will be the greater, the higher the shock wave overpressure will be. Differently stated, the valve varies its closure speed by increasing it consistently with the intensity of the shock wave reaching the valve. On account of the fact that the speed of propagation of the shock wave is bound to the overpressure of the wave, in that to greater overpressure correspond greater speeds of propagation, said feature of the invention permits to obtain valve closing speeds which are higher, the greater is the intensity of the shock wave impinging on said valve.

A further basic principle of the present invention lies in that, as previously indicated, a perfect tightness is obtained as the valve is closed. For this reason, the plug 13, rather than being rigidly connected to the plunger 5, is mounted, with a certain clearance, on the pin 25 which frontally terminates the plunger 5, and a pack of cup springs 26 exists between the plug and the plunger 5. Due to the clearance existing in the connection between the plug 13 and the pin 25 and the cup springs 26, the plug is universally movable, within certain limits, and can be inclined, for example, with respect to the plunger 5 and taking a noncoaxial posture relative thereto. This property permits that the plug, as it contacts its seating on on the casing 1, to rest there against in the most perfect possible way. To improve adherence, in the area where the plug 13 is intended to contact its seating on the casing, a layer of synthetic rubber 29 is applied by vulcanization in situ so as to permit not only that tightness be improved by but also that the effect of the impact of the plug against its seating may be further diminshed.

In the case of valves of a larger size, the room 28 enclosed between the central portion and the peripheral portion of the valve hub, can become available for installing therein the electronic, electric and hydraulic devices which are necessary for the operability of the valve. In such an embodiment, it is enough then, to lead the feeding cables and the closure control cables through suitable bores formed through the gills 2. The advantage of such an arrangement is that of protecting the electronic, electric and hydraulic circuits from impacts, when the valve is resiliently suspended with respect to its supporting fixtures, when the latter are subjected to shocks, earthquakes, vibrations and the like, of any origin. In addition, the electronic and electric devices are shielded against the detrimental action of possible electromagnetic troubles of any origin which become apparent in the area where the valve is installed.

The choke 27, intended to reconvert the kinetic energy stored by the fluid in the throttled section of the valve into pressural energy, so as to reduce to a minimum the pressure drops of the valve, could be of the conventional cone type with a small apical angle, or also of the concentrical cone type, which permit to achieve the same objective with a more limited length.

Although the present invention has been based, for convenience of disclosure, to what has been described and illustrated hereinabove by way of example only, many modifications and changes can be introduced therein, all of them, hoe however, falling within the scope of the appended claims.

I claim:

1. A quick-closing valve, whose closure can be independently controlled by a telecontrol, through an electric-electronic-hydraulic circuit, or by the direct arrival of a shock wave propagated along a pipeline, characterized in that it comprises a plug maintained in its open position by the pressure obtaining in the interior of an oleodynamic cylinder to whose plunger said plug is connected so as to form a movable component part, said pressure overcoming a constantly applied bias which preferably consists of one or more deformed springs, main discharge means being provided for the pressure obtaining in the above named main cylinder and which are controlled by a telecontrol, and subsidiary discharge means for said pressure, directly controlled by the arrival of a shock wave in the pipeline, wherein in said second instance, the actuating members of said subsidiary discharge means concurrently actuate the telecontrol circuit.

2. A magnetic valve according to claim 1, characterized in that the stroke of the movable component part comprises a stage of free acceleration under the bias of the motive springs and a braking stage controlled by a preselected law of variation.

3. A quick closing valve according to claim 2, characterized in that the law of variation of the braking action is so selected as to ensure on the one hand a low impact speed of the plug against its seating and, on the other hand, the minimization of the stresses imposed onto the movable members of the valve due to said braking action.

4. A quick closure valve according to claim 2, characterized in that, in order to embody said law of variation of the braking action, the oleodynamic cylinders has a set of flow ports having a diameter, number and mutual spacing properly selected and through which oil can be dumped from the cylinder, said ports being gradually masked by the moving plunger.

5. A quick closure valve according to claim 1, characterized in that, to obtain the closure of the valve under the action of a direct shock wave, said valve has a plunger placed internally of the main plunger of the valve, said first named plunger being adapted to be shifted by a shock wave, subsidiary discharge ports in the cylinder, independent for the main ports, being opened as the smaller plunger is shifted.

6. A quick closure valve according to claim 5, characterized in that the main plunger has abutment means against which the inner plunger actuated by the shock wave rests after having opened the subsidiary discharge ports, so that the thrust imparted by the shock wave is added to that of the motive springs to accelerate the motion of the movable parts of the valve.

7. A quick closure valve according to claim 5, characterized in that it comprises means adapted to send a signal to the electric-electronic-hydraulic circuit of the valve, effecting the closure thereof in the same way as the telecontrol signal for which said electronic-electric-hydraulic circuit has been provided, said means being actuated by the smaller plunger as driven by the incoming shock wave.

8. A rapid closure valve according to claim 5, characterized in that the fixed structure of the valve body has abutment means for arresting, after a short stroke, the inner plunger by means of which the shock wave coming to the valve drives the movable part thereof, so that the movable part, going on in its motion towards the closing position, causes the closure of the above cited subsidiary discharge ports so that said ports do not hinder the braking motion as obtained by the gradual reduction of the flow area of oil from the main cylinder of the valve.

9. A rapid closure valve according to claim 1, characterized in that the plug is connected universally to the remainder of the movable part of the valve and is mounted with a certain clearance on a pin and is kept spaced apart from the main plunger by a pack of Belleville springs or other suitable springs, thus acquiring a certain degree of freedom such as to permit a perfect adherence thereof to its seating.

10. A rapid closure valve according to claim 1 characterized in that the plug is coated by vulcanized synthetic rubber in the area where the plunger strikes the fixed portion of the valve.

11. A rapid closure valve according to claim 1, characterized in that the inner free spaces of the fixed portion of the valve are arranged the electronic-electric-hydraulic components, properly miniaturized, in order to protect them due to the shielding effect afforded by the metal container, against the effects of external electromagnetic pulses and, when the valve is resiliently suspended to fixtures possibly subjected to natural or artificial seismic motions also against these latter troubles.

12. A rapid closure valve according to claim 11, characterized in that the communication between the components within the valve and the outside of the valve is entrusted to shielded electric cables passed through bores formed through supporting gills of the central valve body, by means of which said central valve body is supported in the interior of the pipeline concerned.

13. A rapid closure valve according to claim 1, characterized in that the external portion of said valve is formed by an inlet cylindrical section having the same diameter as the pipeline to which the valve is connected, followed by a portion which is shaped down to a throttled section, the latter being followed, in turn, by a concentrical-cone choke.